United States Patent
Kashiwagi et al.

(10) Patent No.: US 8,842,392 B2
(45) Date of Patent: Sep. 23, 2014

(54) MAGNETIC RECORDING MEDIUM AND MAGNETIC RECORDING APPARATUS

(75) Inventors: Kazuto Kashiwagi, Ome (JP); Makoto Asakura, Tokyo (JP); Haruhiko Izumi, Ome (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 13/372,367

(22) Filed: Feb. 13, 2012

(65) Prior Publication Data
US 2012/0307403 A1  Dec. 6, 2012

(30) Foreign Application Priority Data

May 30, 2011  (JP) .................................. 2011-120940

(51) Int. Cl.
*G11B 5/82* (2006.01)
(52) U.S. Cl.
USPC ............................................ 360/135; 360/48
(58) Field of Classification Search
None
See application file for complete search history.

(56) References Cited

U.S. PATENT DOCUMENTS

| | | | |
|---|---|---|---|
| 5,073,833 A | 12/1991 | Best et al. | |
| 5,590,009 A * | 12/1996 | Ishida | 360/135 |
| 6,760,172 B1 * | 7/2004 | Hamaguchi et al. | 360/48 |
| 7,102,840 B2 | 9/2006 | Sado | |
| 7,548,388 B2 | 6/2009 | Kaizu et al. | |
| 2004/0190180 A1 * | 9/2004 | Hattori et al. | 360/69 |
| 2005/0036226 A1 * | 2/2005 | Hamaguchi et al. | 360/48 |
| 2005/0213235 A1 * | 9/2005 | Yasunaga | 360/48 |
| 2006/0082918 A1 * | 4/2006 | Kosugi et al. | 360/75 |
| 2007/0223127 A1 * | 9/2007 | Maruyama et al. | 360/51 |

FOREIGN PATENT DOCUMENTS

| | | |
|---|---|---|
| JP | 2554393 | 11/1996 |
| JP | 2000195200 A | 7/2000 |
| JP | 2005-243122 | 9/2005 |
| JP | 4299874 | 7/2009 |

OTHER PUBLICATIONS

Japanese Office Action for Japanese Patent Application No. 2011120940 dated Jun. 27, 2014.

* cited by examiner

*Primary Examiner* — Thang Tran
(74) *Attorney, Agent, or Firm* — Patterson & Sheridan LLP (57) ABSTRACT

According to one embodiment, a magnetic recording medium includes: a data area on which a plurality of first magnetic dots are arranged at predetermined positions to record information; a servo area on which a plurality of second magnetic dots for specifying the positions of said plurality of first magnetic dots are arranged at predetermined positions; and servo frames configured so that a frequency of said servo frames is 2N per circumference of said medium having a radius, that said servo frames are radially discontinuous, and that said servo frame and a space-area, on which no servo frames exist, are alternately radially arranged at a cycle W.

4 Claims, 8 Drawing Sheets

MAGNETIC RECORDING MEDIUM AND MAGNETIC RECORDING APPARATUS

CROSS REFERENCE TO RELATED APPLICATION(S)

The application is based upon and claims the benefit of priority from Japanese Patent Application No. 2011-120940 filed on May 30, 2011, the entire contents of which are incorporated herein by reference.

BACKGROUND

1. Field

Embodiments of the present invention relate to a magnetic recording medium, a magnetic recording apparatus, and a servo control method, which use a bit-patterned medium.

2. Description of the Related Art

Technology called a "pre-servo" method of forming servo patterns on a bit-patterned medium simultaneously with the formation of bit patterns thereon, based on the intensity of magnetization thereof and the volumes of magnetic materials provided thereon, and then performing servo-writing by the single-directional magnetization of the entire surface of the medium is a major candidate for technology applied to the process of forming a servo pattern. Hitherto, servo patterns configuring servo frames provided on the medium, e.g., patterns called servo preambles and servo addresses provided thereon extend continuously from the outer edge to the inner edge of the medium. If a magnetic film (e.g., CoCr—SiO2-based granular film) to be subjected to conventional vertical magnetic recording is used, the magnetization state thereof is stable after the servo-writing. However, if a magnetic film (e.g., FePt or CoPt based single-magnetic-domain film) specialized to a bit-patterned medium is used, unintended magnetic walls are formed on servo patterns due to external energy such as thermal disturbance. That is, although all servo patterns formed in servo frames should be magnetized in a single direction (e.g., N-direction), the magnetization direction of the servo frames is naturally changed to the opposite direction (e.g., S-direction) due to the occurrence of magnetic walls. This causes noise and address-decoding-error. Effective countermeasures against this phenomenon are to reduce the areas of the patterns in the servo frames and to segmentalize each of the patterns. However, from the viewpoint of servo control, to detect a radial position continuously, it is necessary that information recorded on each servo frame is normally reproduced at any radial position.

Accordingly, it is devised that the patterns are provided at positions which are radially discrete and circumferentially different from one another. However, no means is known, which uses the configuration of the entire servo patterns and implements better reproduction.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

DETAILED DESCRIPTION

Hereinafter, an embodiment of the invention is described with reference to FIGS. 1 to 8.

Figure 6:
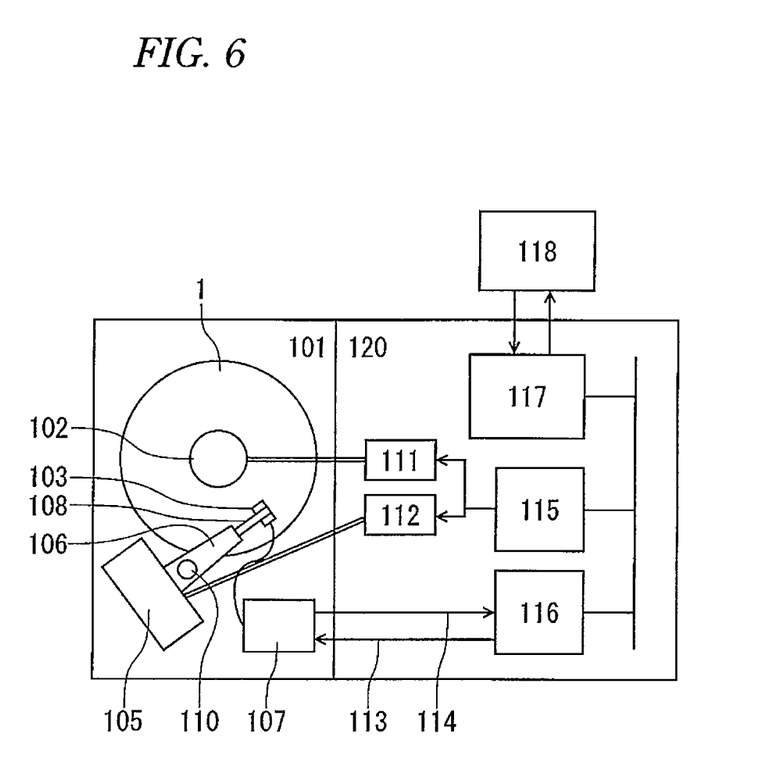
FIG. 6 is a schematic diagram illustrating the configuration of an example of a magnetic recording apparatus having a magnetic recording medium according to the embodiment of the invention.

First, FIG. 6 is a schematic diagram illustrating the configuration of a magnetic recording (reproducing) apparatus having a magnetic recording medium (to be described below) according to an embodiment of the invention. The magnetic recording apparatus illustrated in FIG. 6 has a disk-like magnetic recording medium (magnetic disk medium) 1 (hereinafter, a magnetic recording apparatus having a magnetic disk medium is referred to as a magnetic disk apparatus).

The magnetic disk apparatus includes a disk enclosure 101 and a circuit board 120.

The disk enclosure 101 is a container that hermetically encloses the magnetic disk medium 1, a spindle motor (SPM) 102, a magnetic head 103, an actuator 105, a head gimbal assembly 108, a carriage arm 106, a shaft 110, a head amplifier 107, and the like mounted therein. The actuator 105 includes a voice coil motor (VCM (not illustrated)). The magnetic disk medium 1 is mounted on the SPM 102. The magnetic head 103 includes at least one of a recording (write) device (not illustrated) that records magnetic information on the magnetic disk medium 1, and a reproducing (read) device (not illustrated) that reads the magnetic information recorded on the magnetic disk medium 1 as electric signals. The recording device includes, e.g., a write coil, a main magnetic pole layer, and an auxiliary pole layer. The write coil has a function of generating a magnetic flux. The main magnetic pole layer has a function of containing the magnetic flux generated by the write coil, and releasing the magnetic flux to the magnetic disk. The auxiliary magnetic pole layer has a function of circulating, via the magnetic disk, the magnetic flux released from the magnetic pole layer. The reproducing device is, e.g., a magneto-resistance effect device (hereinafter referred to as an MR device). The magnetic head 103 is mounted on the head gimbals assembly 108, and arranged to face the magnetic disk medium 1.

Various magnetic recording media (to be described below) can be used as the magnetic disk medium 1. An end portion of the head gimbal assembly 108, on which the magnetic head 103 is not mounted, is fixed to a distal-end of the carriage arm 106. The carriage arm 106 can be swung by the VCM using the shaft 110 as the rotation axis. The swinging of the carriage arm 106 enables the magnetic head 103 to scan on the magnetic disk medium 1 substantially radially. The magnetic head 103 is positioned on a desired recording track of the magnetic disk medium 1. Consequently, the magnetic head 103 can write information to the recording bits arranged on the recording tracks of the magnetic disk medium 1, or read information from the magnetic disk medium 1. The head amplifier 107 has a function of feeding, based on a recoding signal 113, electric current to the recording device mounted on the magnetic head 103 to record information on the magnetic disk medium 1, or convert into a reproduction signal 114 magnetized information on the magnetic disk medium 1, which is detected by the reproducing device of the magnetic head 103.

The circuit board 120 includes a read channel 116, a microprocessing unit (MPU) 115, an SPM driver 111, a VCM driver 112, a disk controller 117, and the like. The read channel 116 has a function of decoding the reproducing signals (i.e., servo signals or data signals) 114 supplied from the head amplifier 107 to convert the reproducing signals into digital information, or to convert information, the recording of which is instructed by the disk controller 117, into recording signals 113 for driving the head amplifier 107.

The MPU 115 drives the VCM driver 112 to perform a positioning control operation on the magnetic head 103, or drives the SPM driver 111 to perform a rotation control operation on the magnetic disk medium 1, based on the digital information represented by the servo signal (servo information) decoded by the read channel 116.

The disk controller 117 has a function of instructing, according to a recording/reproducing instruction sent from a host computer 118, the MPU 115 to position the magnetic head 103 to perform the addressing of the magnetic head 103 to the magnetic disk medium 1 of the magnetic head 103. In addition, the disk controller 117 has another function of performing operations of transmitting and receiving digital information to be recorded and reproduced to and from the read channel 116, and replying a result to the host computer 118.

Figure 7:
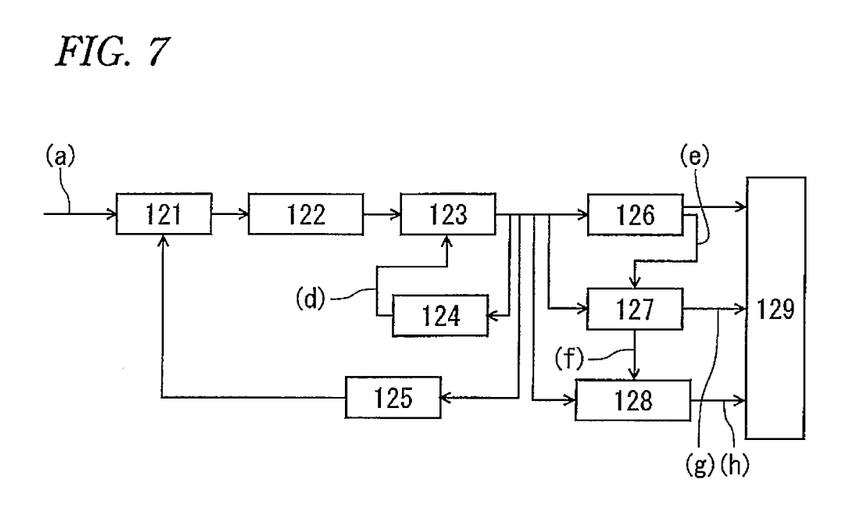
FIG. 7 is a block diagram illustrating a servo signal demodulation circuit in the magnetic disk apparatus according to the embodiment.
Figure 8:
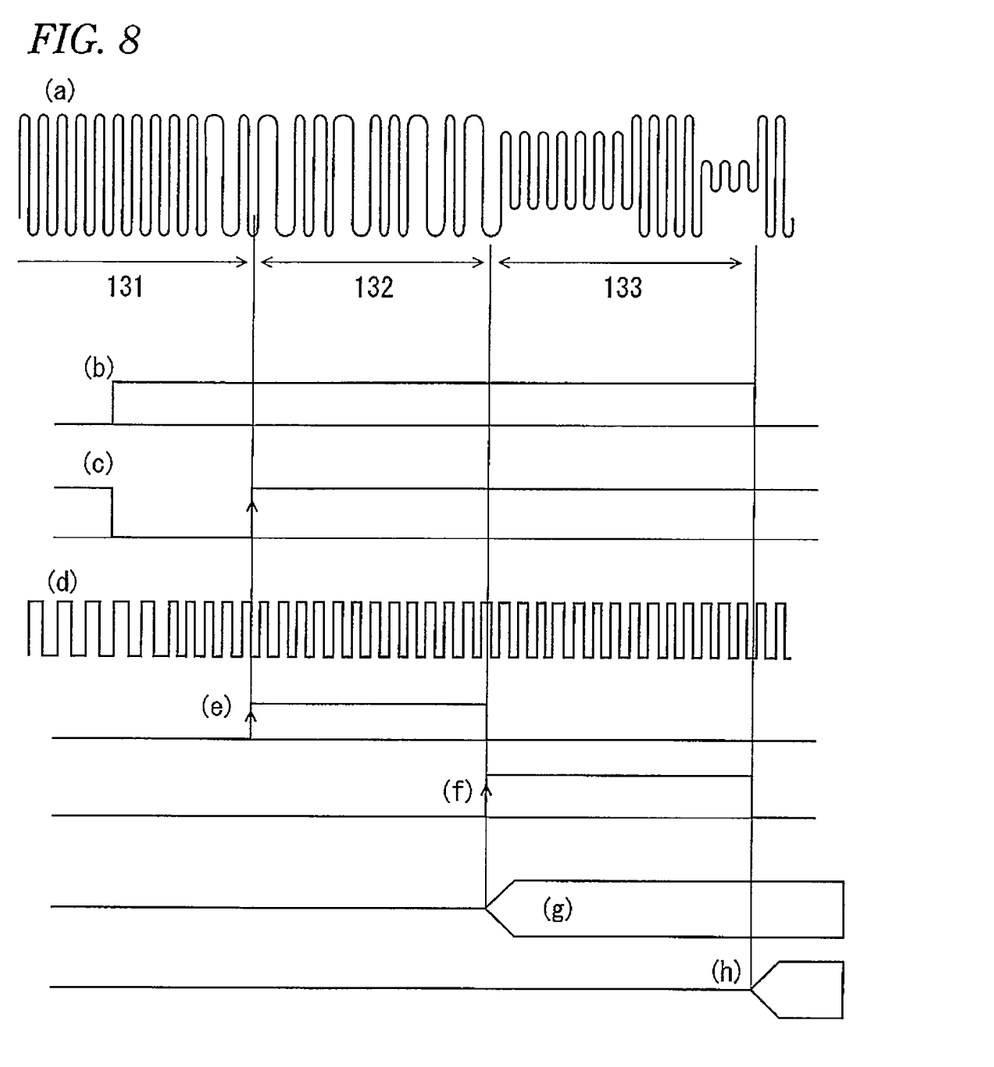
FIG. 8 is a chart illustrating operation timings of the servo signal demodulation circuit in the magnetic disk apparatus according to the embodiment.

FIG. 7 is a block diagram illustrating an operation performed by the read channel 116 when reading the servo information recorded on the magnetic disk medium 1 while the MPU 115 performs a positioning control operation on the magnetic head 103 in the magnetic disk apparatus having a magnetic disk medium 1 according to the present embodiment. FIG. 8 is a timing chart illustrating the operation of the read channel 116.

An example of the configuration of a servo pattern is such that a preamble region for clock synchronization is followed by a servo address mark (SAM) providing a reference timing for reproducing a servo signal, that the SAM is followed by an address pattern representing a sector number and a track number, and that additionally, the address pattern is followed by a burst pattern for detecting the position of the magnetic head.

That is, the magnetic disk medium 1 rotates at a constant angular velocity. Accordingly, servo pattern reproduction signals (a) are obtained from the head amplifier 107 at constant time intervals. The servo pattern reproduction signal (a) is subjected to the cutoff of high-frequency noise components by a low-pass filter 122 in the read channel 16. Then, the resultant signal undergoes analog-to-digital (A/D) conversion performed by an A/D converter 123. The gain of a variable gain amplifier 121 is adjusted, based on digitized amplitude information, by a gain controller 125 to obtain an optimal amplitude.

A pattern having a constant cycle is written to an introduction portion of the servo pattern as a synchronization signal generation portion 21. A servo gate signal (b) is preliminarily asserted to obtain a wavenumber sufficient to allow an output of a phase-locked loop (PLL) circuit 124 to converge.

When the servo gate signal (b) is asserted, PLL-technique is applied to the synchronization signal of the servo pattern reproduction signal. Then, an analog-to-digital conversion (ADC) clock signal (d) necessary for sampling an address portion and a fine position detection portion, which appear in the servo pattern reproduction signal, is generated from the PLL circuit 124.

At a termination-end of the synchronization signal generation portion 21 of the servo pattern, a servo sync mark pattern indicating the start-point of the servo information is written in bits each having a constant length or in specific code pattern bits. When the servo sync mark pattern is detected, a synchronization pattern detection signal (c) is asserted.

When a synchronization signal detector 126 detects that the synchronization pattern detection signal (c) is asserted, the synchronization signal detector 126 sends an address detection gate signal (e) to an address demodulator 127. Thus, the demodulation of the address portion to be next produced is performed.

Upon completion of demodulation of the address portion having a default length, an address demodulation value (g) is definitely determined and recorded in a register 129 as digital information. Then, a burst gate signal (f) is asserted. Thus, the demodulation of the fine position detection portion is started by a fine position demodulator 128.

Upon completion of demodulation of the fine position detection portion having the default length, a fine position demodulation value (h) is definitely determined and recorded in the register 129 as digital information.

With the above operations, the MPU 115 reads the address demodulation value (g) and the fine position demodulation value (h) stored in the register 129. Then, the MPU 115 performs calculation necessary for the positioning control operation on the magnetic head 103. Thus, the MPU 115 drives the VCM driver 112.

Description of Points (1) and (2) of Embodiment

Figure 1:
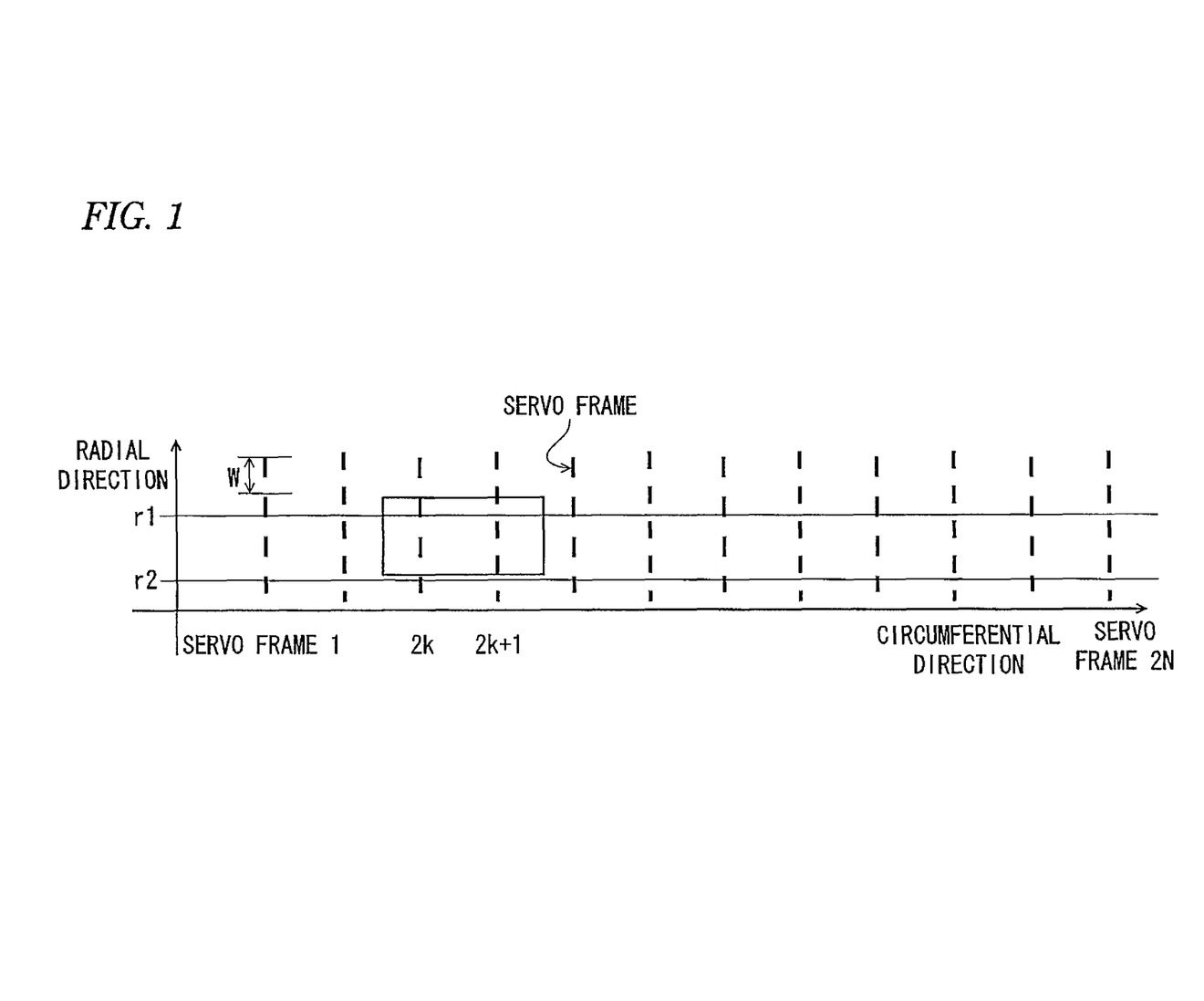
FIG. 1 is a diagram illustrating the arrangement of servo frames on a medium according to an embodiment of the invention.
Figure 3:
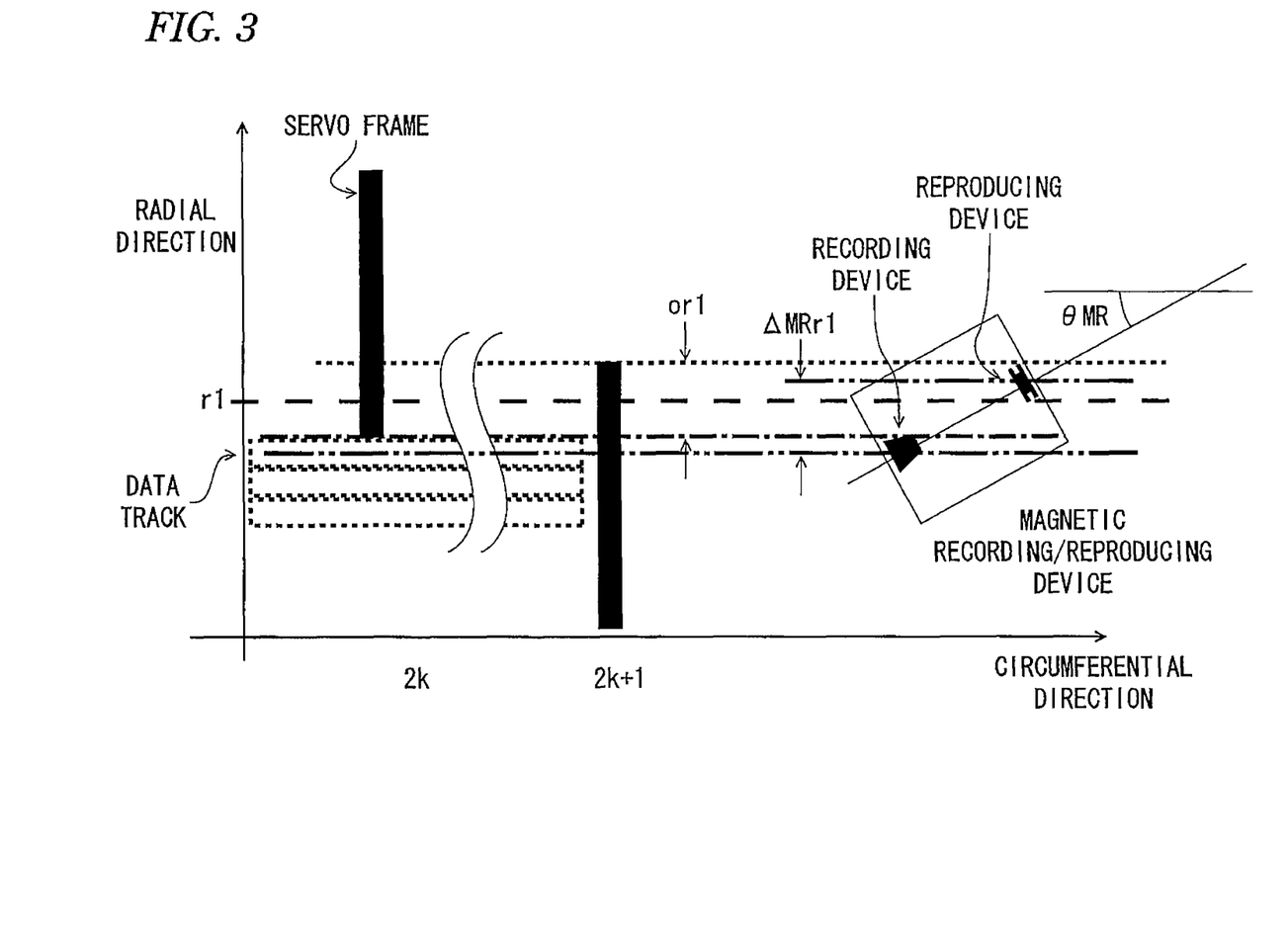
FIG. 3 is a further enlarged diagram illustrating the vicinity of the servo frames at the radius r1 and the relation between distances or1 and ΔMRr1 in FIG. 2.

According to the present embodiment, an inner end portion of the servo frame $2k$ and an outer end of the servo frame $2k+1$, which touch a radius r, are set to overlap with each other by a constant width or1. Thus, it is implemented to continuously detect a radius. Accordingly, (1) in a hard disk drive (HDD) apparatus using a bit-patterned medium, each initial servo frame on the medium is radially segmented into servo frames at a cycle W. As is seen from FIG. 1, 2N initial servo frames are arranged along one circumference of a circle. In addition, (2) as illustrated in FIG. 1, the number of servo frames, each of which touches the circumference of a circle having a radius r2 and corresponds to an associated one of the initial servo frames, is N. On the other hand, the number of servo frames, which touch the circumference of a circle having a radius r1 and respectively correspond to the initial servo frames, is 2N. As illustrated in FIG. 3 enlargedly showing the vicinity of the servo frames $2k$ and $(2k+1)$ that touch the circumference of a circle having a radius r1, the servo frames $2k$ and $(2k+1)$ are set to radially overlap with each other by a constant width or1 in the vicinity of a radial position corresponding to the radius r1.

Description of Point (3) of Embodiment

In addition, from the viewpoint of recording data on the medium without waste areas, the gap portion between the servo frames obtained by segmentation is used as a data area.

Figure 2:
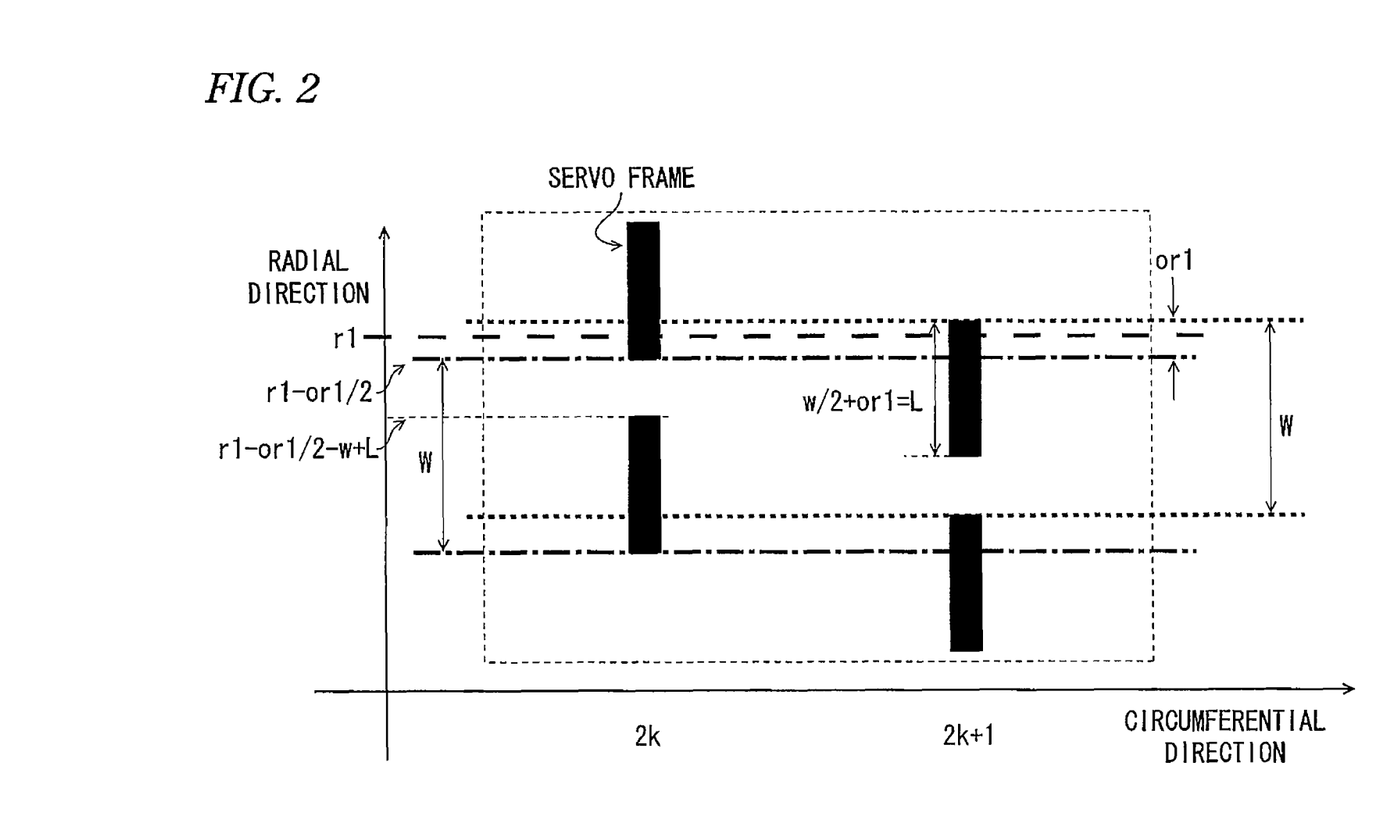
FIG. 2 is an enlarged diagram illustrating the vicinity of servo frames $2k$ and $2k+1$ at a radius r1 in FIG. 1.

That is, as illustrated in FIG. 2, data is recorded on the servo frame gap portion extending from an inner end r1−or1/2 of the servo frame 2k touching the circumference of a circle having the radius r1 to an outer end r1−or1/2−W+L, of the next servo frame arranged at an inner side in the same radial direction. Thus, when data is recorded on the vicinity of the inner end r1−or1/2 of the servo frame 2k touching the circumference of the circle having the radius r1, the reproduction information of the servo frame 2k cannot be used. Accordingly, it is necessary to perform accurate positioning based on position information corresponding to (2k+1) servo frames. However, in an MR-type magnetic recording/reproducing head, a reproducing device and a recording device are installed by being spaced at a distance in the direction of a straight-line. If a skew angle is θMR, as illustrated in FIG. 3, a constant radial MR offset amount therebetween is ΔθMRr1. To achieve the above accurate-positioning at the recording of data, it is necessary for recording data at a radial position r1−or1/2 along the servo frame 2k that the servo frame 2k+1 should extend to at least a radial position r1−or1/2+ΔθMRr1. The reason is that while a servo frame extending outwardly radially to a radial position r1+or1/2 is read, data is written to a data track at the inner side in the radial direction of an adjacent servo frame.

Figure 4:
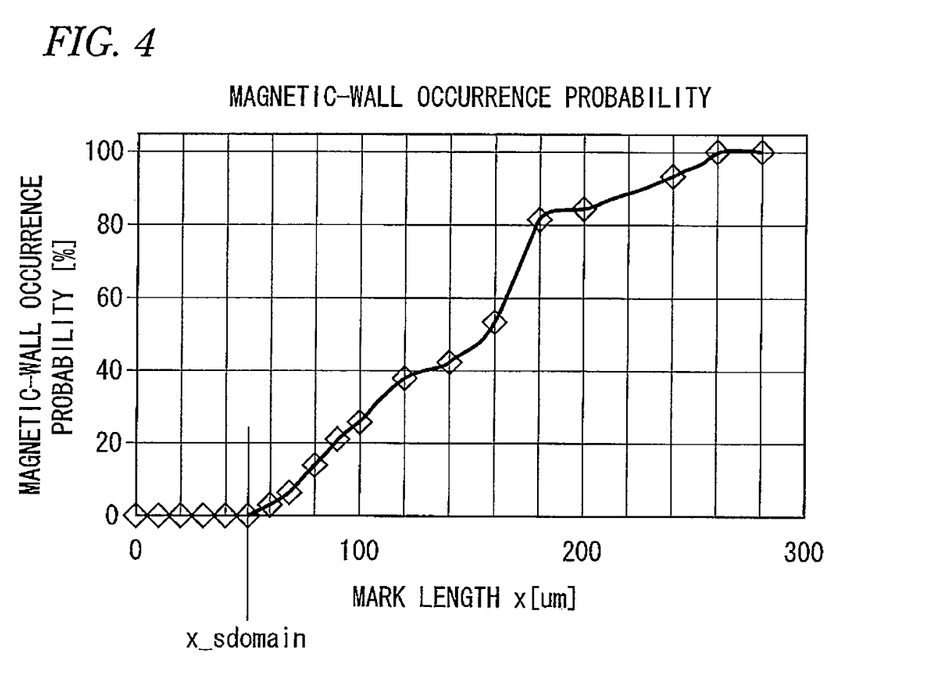
FIG. 4 is a graph illustrating the occurrence probability of a magnetic wall versus a mark x length measured at a servo pattern in the case of using a certain magnetic film.

Thus, according to the present embodiment, the overlapping width or1, in which the servo frames 2k and 2k+1 overlap with each other, at the radial position r1 is set as follows: or1≥ΔθMRr1. Accordingly, the point (3) is that the overlapping width on between the servo frames at the radial position r1 illustrated in FIG. 4 is larger than the MR offset amount ΔθMRr1 at the radial position r1.

Because the skew angle ΔθMR depends upon the absolute amount of the radius r1, the MR offset amount ΔθMRr1 changes. The overlapping width or1 can change depending upon the radius.

Description of Point (4) of Embodiment

A radial continuous length L of the servo frame illustrated in FIG. 2 is determined, based on a condition that no magnetic walls are generated in the servo pattern configuring the servo frame. FIG. 4 illustrates results of measurement of magnetic-wall occurrence probability versus radial mark length x in a case where magnetic walls were generated at an accelerated rate in a magnetic recording medium having a servo pattern intentionally changed in radial mark length x by performing a high-temperature environment test within the magnetic recording apparatus. The magnetic-wall occurrence probability versus the mark length x depends upon the detailed type of a magnetic film, the circumferentially maximum width of the servo pattern, or the like. However, it was found that in this medium, no reverse magnetic domains were generated when the mark length was equal to or less than, e.g., 50 um. Accordingly, (4) the radial length L of a servo frame having a certain radius is set such that L=W/2+or1<x_sdomain, based on comparison with the mark length x_sdomain at which the magnetic film of the servo pattern configuring the servo frame can maintain the single domains without generating magnetic walls, the cycle W described in the point (1), and the overlapping width or1 described in the point (3). Thus, the magnetic recording medium is designed so that the mark length L is 50 um.

Description of Point (5) of Embodiment

When the magnetic recording of data on the gap between the servo frames is implemented as illustrated in FIG. 3, the recording/reproducing of data and the reproducing of servo signals cannot simultaneously be performed at the same circumferential positions, because of restrictions due to the processing performance of the sector servo system or the crosstalk of a magnetic recording field onto the reproducing device. Therefore, even if the positioning of the head to a radial position r1 at which 2N servo frames appear at the associated positions arranged in the circumferential direction is performed, position detection can be performed only on N servo frames when the recording or reproducing is performed. Meanwhile, during a seek operation, it is difficult to predict in advance how the head passes through the gap portion between the servo frames k and k+1. Both the servo frames k and k+1 may not be randomly detected at each radius at which the seek operation is being performed. However, the magnetic disk apparatus is not subjected to the restriction that the position detection is performed only on N servo frames, though the apparatus undergoes such a restriction during the recording/reproducing of data. Accordingly, the influence of the difficulty of the prediction can be alleviated by performing the detection on all of 2N servo frames.

Figure 5:
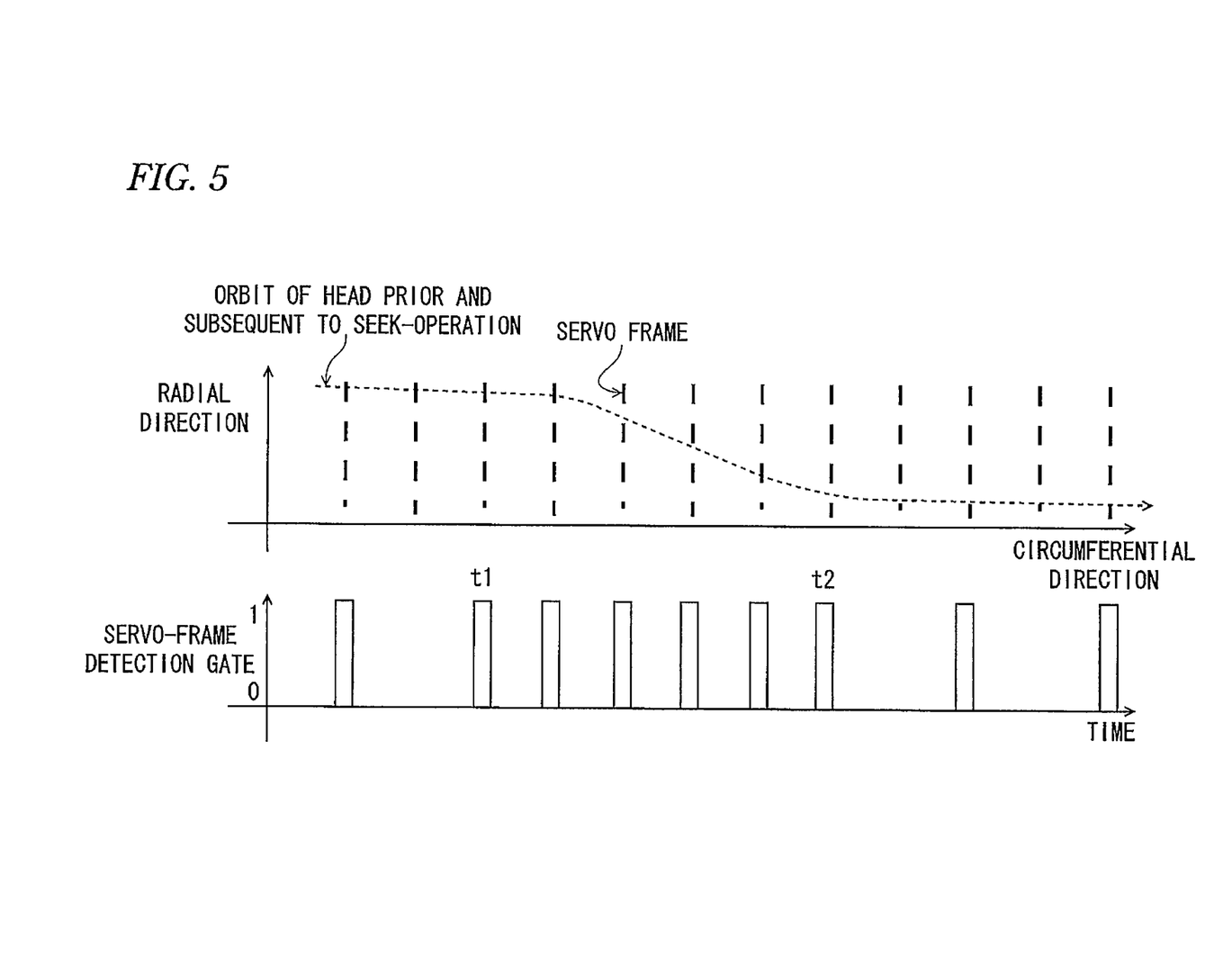
FIG. 5 is a diagram illustrating the relation between the orbit of a magnetic-head used in an embodiment at a seek-operation and a servo detection timing.

FIG. 5 illustrates the timings of detection of a head orbit and servo frames in a case where at moment t1, a recording/reproducing operation is ended, and a seek operation is started, and where at moment t2, the end of the seek operation is determined. Until moment t1, the servo patterns are reproduced at a frequency of N per circumference. When a seek process is started at moment t1, the frequency of detection of servo patterns increases to 2N per circumference. Consequently, the risk of failure of position detection, which would be caused due to the passing of the head through the gap while the seek process is performed, is reduced. Even when no servo gate signal is generated due to a method illustrated in FIG. 8, the frequency of the detection can be increased by predicting the timing of opening the gate.

Then, at moment t2, it is determined whether an output of the PLL circuit is converged. Thus, the frequency of detection of servo patterns is reduced back to N. Consequently, the apparatus is brought into a state in which the recording and reproducing of data can be performed. Accordingly, in the present embodiment, (5) the detection of servo patterns is performed at the frequency high than 2N per circumference.

Description of Advantages of Points (1) and (2) of Embodiment

Each servo frame is radially segmented. Thus, the generation of magnetic walls in the servo frame, and the erroneous reproduction of servo patterns thereon are prevented. The detection of the position of a normal servo pattern is implemented. In addition, the continuous detection of a radial position is implemented even in the vicinity of each segmented portion of the servo frame.

Description of Advantages of Point (3) of Embodiment

The overlapping width between the segmented portions of the servo frames is set to be equal to or larger than the amount of the MR offset. Thus, the recording/reproducing of data to and from the gap portion between the servo frames are enabled. Efficiency of formatting can be enhanced. Data can be recorded without waste.

Description of Advantages of Point (4) of Embodiment

The radius length of the servo frames at practical segmentation is designed from the relation between the magnetic-wall occurrence probability and

Description of Advantages of Point (5) of Embodiment

The frequency of detection of servo patterns at the seek operation is set at 2N per circumference. Thus, the failure of the position detection due to the random passing of the head through the gap between the servo frames is restricted from occurring. A normal seek operation is enabled.

The related art doesn't disclose the configuration in which the servo frames radially overlap with each other at a certain radius and in which 2N servo frames touch the circumference of a circle having the radius. The related art discloses neither the requirement for determining the radial length L of the servo frame for preventing the generation of magnetic walls in the servo patterns configuring the servo frames nor the control operation performed during the seek operation.

The risk of occurrence of the erroneous reading of the servo patterns configuring the servo frames due to the generation of the magnetic walls in the servo patterns can be removed, as compared with the related art. The radial width of a non-data part in the radial discontinuous portion can be minimized, i.e., confined to a level comparable to the MR offset amount.

In the bit patterned medium, servo information is degraded due to the generation of the reverse magnetic domain. The arrangement of servo frame segments on the medium, and a servo-frame control method for suppressing this degradation and assuring the formatting efficiency maximally have been described.

That is, the embodiment has the following characteristics in magnetic recording using the bit-patterned medium.

(1) The embodiment has servo frames formed so that the frequency of the servo frames is 2N per circumference of the circle of the medium, that the segmented servo frames are radially discontinuous, and that the servo frame and a space-area, on which no servo frames exist, are alternately radially arranged at a cycle W.

(2) The number of servo frames arranged to touch the circumference of a circle having a certain radius r is N per circumference or 2N per circumference.

(3) If the number of servo frames arranged to touch the circumference of a circle having a certain radius r1 is 2N per circumference, the radial overlapping-width on between the adjacent ones of 2N servo frames arranged at a frequency of 2N per circumference to touch the circumference of the circle having the radius r1, which has been described in (2), is set to be equal to or larger than the read/write offset amount $\Delta MRr1$ of the magnetic-head, which corresponds to the radius r1.

(4) The radius length L of the servo frame corresponding to a certain radius is set such that $L=W/2+or1<x\_sdomain$, based on comparison with the mark length x_sdomain at which the magnetic film of the servo pattern configuring the servo frame can maintain the single domains without generating magnetic walls, the cycle W described in the point (1), and the overlapping width on described in the point (3).

(5) The detection of servo patterns is performed at a frequency equal to or higher than 2N per circumference during the seek operation.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording medium comprising:
   a data area on which a plurality of first magnetic dots are arranged at predetermined positions to record information;
   a servo area on which a plurality of second magnetic dots for specifying the positions of said plurality of first magnetic dots are arranged at predetermined positions; and
   servo frames, each of which includes information indicating an address on said medium, configured so that said servo frames are radially discontinuous, and so that said servo frames and space-areas, on which no servo frames exist, are alternately radially arranged at a cycle W,
   wherein the number of said servo frames arranged to touch a circumference of said medium having a radius r is N per circumference or 2N per circumference, N being a natural number, and
   wherein when the number of said servo frames arranged to touch the circumference of said medium having a radius r1 is 2N per circumference, a radial overlapping-width or1 between adjacent ones of said servo frames arranged at a frequency of 2N per circumference to touch the circumference of said medium having the radius r1 is set to be equal to or larger than a read/write offset amount $\Delta MRr1$ of a magnetic head, which corresponds to the radius r1.

2. The magnetic recording medium according to claim 1, wherein a radius length L of each of said servo frames corresponding to a radius is set such that $L=W/2+or1<x\_sdomain$, based on comparison with a mark length x_sdomain at which a magnetic film of a servo pattern configuring each of said servo frames maintains single magnetic-domains without generating magnetic walls, the cycle W, and the overlapping-width or1.

3. A magnetic recording apparatus comprising:
   a magnetic recording medium, said medium comprising:
      a data area on which a plurality of first magnetic dots are arranged at predetermined positions to record information,
      a servo area on which a plurality of second magnetic dots for specifying the positions of said plurality of first magnetic dots are arranged at predetermined positions, and
      servo frames, each of which includes information indicating an address on said medium, configured so that said servo frames are radially discontinuous, and so that said servo frames and space-areas, on which no servo frames exist, are alternately radially arranged at a cycle W; and
   a magnetic head comprising a device configured to face the surface of said medium to record or reproduce magnetic information on or from said medium,
   wherein the number of said servo frames arranged to touch a circumference of said medium having a radius r is N per circumference or 2N per circumference, N being a natural number, and
   wherein when the number of said servo frames arranged to touch the circumference of said medium having a radius r1 is 2N per circumference, a radial overlapping-width or1 between adjacent ones of said servo frames arranged at a frequency of 2N per circumference to touch the circumference of said medium having the radius r1 is set to be equal to or larger than a read/write offset amount $\Delta MRr1$ of the magnetic head, which corresponds to the radius r1.

4. The magnetic recording apparatus according to claim 3, wherein a radius length L of each of said servo frames corresponding to a radius is set such that $L=W/2+or1<x\_sdomain$, based on comparison with a mark length x_sdomain at which a magnetic film of a servo pattern configuring each of said servo frames maintains single magnetic-domains without generating magnetic walls, the cycle W, and the overlapping-width or1.

* * * * *